United States Patent Office 3,421,315
Patented Jan. 14, 1969

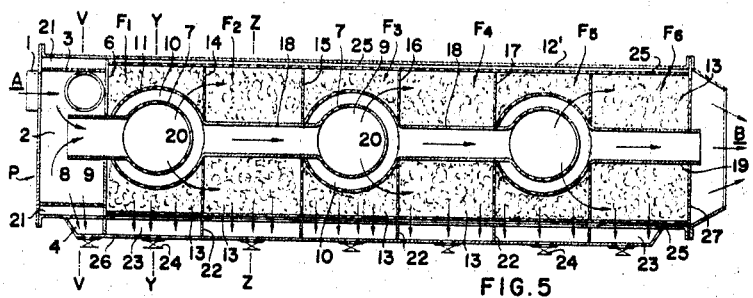
FIG.5
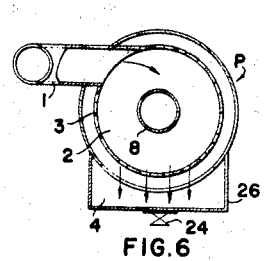
FIG.6
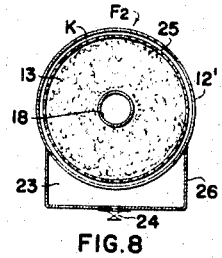
FIG.7
FIG.8
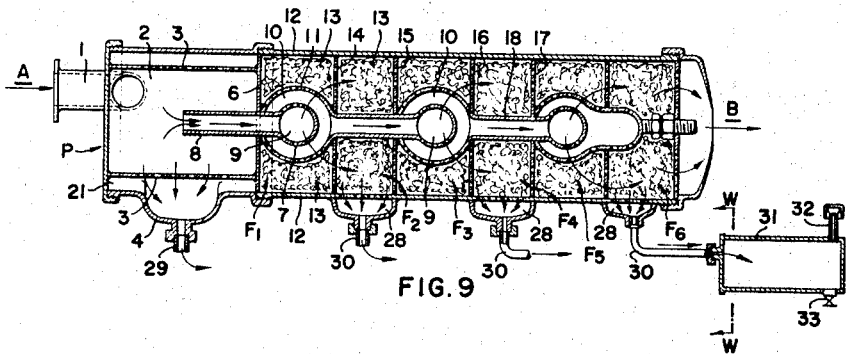
FIG.9
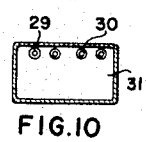
FIG.10

3,421,315
EXHAUST GAS PURIFIER FOR AUTOMOBILE
Katashi Aoi, 480 Juniso, Kamakura-shi,
Kanagawa-ken, Japan
Filed Jan. 25, 1967, Ser. No. 611,725
Claims priority, application Japan, Feb. 1, 1966,
41/5,964; May 30, 1966, 41/34,662; Aug. 13,
1966, 41/76,406; Dec. 12, 1966, 41/113,334,
41/113,335
U.S. Cl. 60—29
Int. Cl. F02b 75/10
6 Claims This invention relates to a device for purifying exhaust gas from automotive engine which runs on a gaseous fuel such as gasoline, heavy oil, liquefied propane gas or the like, by separating and collecting by sorption the sulfurous acid gas, lead tetrachloride, nitrogen oxide and other noxious substances and carbon particles from the exhaust.

The present invention has for a particular object improvements of an exhaust gas purifier of the type which thermally insulates and expands the exhaust gas in a filter medium and condenses the water vapor thus produced thereby permitting the noxious substances and fine carbon particles to be dissolved in the condensed vapor and then allows the water which contains such impurities to be adsorbed by the filter medium.

It is another object of the invention to provide an exhaust gas purifier having a filter medium of a remarkably increased filtration ability and which is capable of use for an extended period of time.

Another object of the invention is to provide an exhaust gas purifier equipped with a separator for pretreatment in which exhaust gas from the gas inlet side is led into a perforated cylindrical body in a direction tangential thereto and a cyclonic motion is imparted to the gas in the cylinder and at the same time the gas is thermally insulated and expanded with the result that the water vapor in the gas is condensed to a group of water drops due to the temperature drop, and then the group of water drops in which the noxious substances of the gas are dissolved and also coarse carbon particles are separated by the centrifugal force caused by the cyclonic motion through the perforations of the cylinder into an external settling chamber for subsequent removal.

Another object is to provide an exhaust gas purifier equipped with filters whereby the gas taken out of the separator is again thermally insulated and expanded and the water vapor is condensed to form groups of water drops thereby permitting noxious contents of the gas to be dissolved in the water drops and thus the gas mixed with the water drops containing the noxious substances is led into filter chambers packed with filter medium so that the fine carbon particles and groups of water drops can be absorbed by the filter medium for the purification of the gas.

Another object is to provide filters having means for separating fine carbon particles and other wastes from the filter medium thereby to prolong the life of the medium.

Yet another object is to provide an exhaust gas purifier equipped with means for positively taking out the separated noxious substance-containing liquid from the separator for pretreatment and filters in order thereby to prevent the re-evaporation and mixing into the gas of the noxious substances once separated.

A further object is to provide an exhaust gas purifier equipped with means for neutralizing the separated noxious substances before being released into the atmosphere.

Other objects and advantages of the present invention will become apparent from the following descriptions of the invention taken in connection with the accompanying drawings.

In the drawings, same reference numerals designate same parts throughout the figures.

The present invention will be described in more detail by the following embodiments thereof shown in the accompanying drawings in which:

FIG. 5 is a longitudinal sectional view of a further improved form of the invention;

FIGS. 6, 7 and 8 are cross-sectional views taken along the lines V—V, Y—Y, and Z—Z, respectively, of FIG. 5;

FIG. 9 is a longitudinal sectional view of a form of exhaust gas purifier for automobile equipped with a sludge collecting tank;

FIG. 10 is a cross-sectional view taken along the line W—W of the sludge collecting tank shown in FIG. 9;

Figure 1:
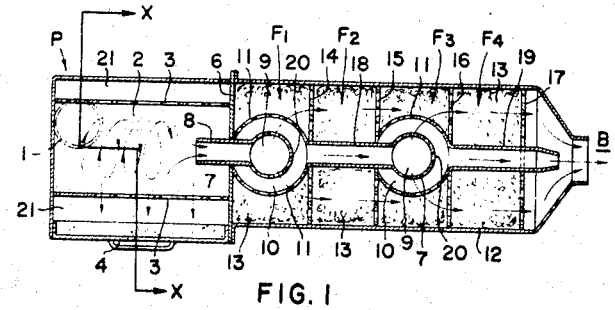
FIG. 1 is a longitudinal sectional view of a typical form of exhaust gas purifier for automobile embodying the invention.
Figure 2:
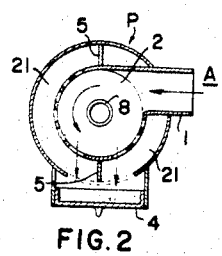
FIG. 2 is a cross-sectional view taken along the line X—X of FIG. 1.

The purifier shown in FIGURES 1 and 2 generally consists of a separator P for pretreatment of exhaust gas and filters F1, F2 and so forth. The separator P for pretreatment consists of a separating chamber 2 for pretreatment surrounded by a perforated barrier cylinder 3, a settling chamber 21 defined between the periphery of said perforated barrier cylinder 3 and an outer cylinder which is disposed at a certain distance from the perforated cylinder and surrounds the same, a gas inlet pipe 1 which opens into said perforated barrier in such manner that the exhaust gas from intake side A can be blown into the separating chamber 2 for pretreatment in a direction tangential thereto, a gastight partition wall 6 which is disposed between the separator P for pretreatment and a first filter F1, an outlet pipe 8 which penetrates through the gas-tight partition wall 6 to bring the pretreated exhaust gas into the filter F1, a baffle plate 5 fitted inside the settling chamber along the longitudinal direction thereof for the purpose of preventing swirling of the gas stream, and a reservoir vessel 4 detachably fitted to an opening provided on the bottom of said outer cylinder.

Description will now be made of the operation of the separator for pretreatment of exhaust gas which is constructed as above.

Exhaust gas from an engine is introduced at high speed through the intake A and inlet pipe 1 into the separating chamber 2 for pretreatment in the direction tangential to the perforated cylinder. In the separating chamber 2 for pretreatment the gas is thermally insulated, expanded and is imparted with a swirling motion. Thus, while swirling at a high velocity around the inner wall surface of the perforated cylinder, the gas proceeds gradually toward the outlet pipe 8.

In the meantime, the water contained in the gas is condensed by the heat insulation and expansion, with the result that the noxious components of the gas such as sulfurous acid gas, lead tetrachloride and aldehydes are dissolved in the condensed water drops. Because of their high specific gravity values, the groups of water drops thus condensed and coarse particles of carbon are both separated and concentrated centrifugally on or about the inner wall surface of the perforated cylinder 3. Next, the groups of water drops and coarse carbon particles are forced out of the separating chamber 2 for pretreatment through the perforations thereof and is led into the settling chamber 21. Since the settling chamber 21 is provided with the baffle plate 5 for preventing swirling of the gas stream, the gas is kept from swirling at any high velocity in the chamber, and therefore the groups of water drops and coarse carbon particles settle down efficiently and are collected on the drain reservoir 4 detachably fitted to the bottom. Exhaust gas released from the engine is imparted with a swirling motion and is thereby led into ensuing filter, wherein it is roughly cleaned before the noxious components are separated by sorption.

Next, explanation will be made of the exhaust gas filters. The filters F1, F2, F3 and so forth are arranged in a substantially cylindrical casing 12 which is provided at one end with an opening surrounded by an edge flanged to the gastight partition wall 6 of the separator P for pretreatment and at the other end with a hole of a smaller diameter for releasing purified exhaust gas.

In the casing 12 are arranged longitudinally in spaced relationship a plurality of perforated wall plates 14, 15, 16, 17 and so forth which are provided with holes which permit insertion therethrough of pipes substantially the same in diameter as the outlet pipe 8 and which are also provided with a multiplicity of small holes around said pipe holes. The first filter F1 is formed in a space defined by the gastight partition plate 6 and the perforated wall plate 14. By connecting a perforated wall 7 of hollow spherical shape having a greater cross sectional area than that of the outlet pipe 8 to the end of said outlet pipe 8 which protrudes into the above space, a gas expansion chamber 9 is provided. Outside the perforated wall 7 of hollow spherical shape another perforated wall 11 of hollow spherical shape but which has an even greater cross sectional area is concentrically disposed, so that a moisture condensing chamber 10 is defined between the two perforated walls 7, 11 of the hollow spherical configuration. The hollow spherical perforated wall 11 has an opening on one side which receives the outlet pipe 8 and on the side opposite to said opening, it is also provided with an opening communicating to an outlet pipe 18 for guiding part of exhaust gas into the third filter F3. In the space defined by the second hollow spherical perforated wall 11, casing 12, gastight partition plate 6, and perforated wall plate 14, a heat-resisting filter medium 13 of fibrous structure such as glass fibers or fine metallic wires is packed to a desired density. Midway the space between the first perforated wall 14 and second perforated wall 15 there is provided the outlet pipe 18 which communicates the condensing chamber 10 of the first filter F1 with the heat-insulating expansion chamber 9 of the third filter F3 to be described later. Around the pipe 18 is disposed the second filter F2 which is packed with the same heat-resisting filter medium 13 as above mentioned. The second filter F2 differs from the first one in that it is not provided with any exhaust gas expansion chamber or condensing chamber. The third filter F3 is located in the space between the second perforated wall 15 and third perforated wall 16. The third filter F3 is identical in construction with the first filter F1. In the embodiment shown, however, a discharge pipe 19 which opens in the exhaust side B is connected, in place of the outlet pipe 18, to one side of the hollow perforated wall 11. Finally, in the space between the third perforated wall 16 and the fourth perforated wall 17, a fourth filter F4 of the same construction as that of the second filter F2 is arranged. In this embodiment, the fourth filter F4 is pierced through by the discharge pipe 19 rather than by the outlet pipe 18. Non-perforated wall 20 is used to form the area facing the exhaust side B of the hollow perforated spherical wall 11 which constitutes each heat-insulating expansion chamber 9.

Figure 3:
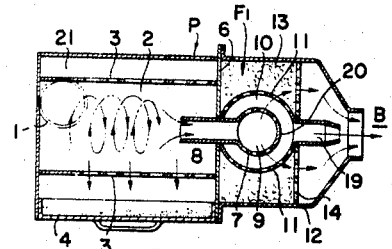
FIG. 3 is a longitudinal sectional view of another simplified form of the invention.

As explained above, the filters associated with the separator P for pretreatment are so constructed that the filters each having a heat-insulating expansion chamber 9 and a condensing chamber 10, e.g. first filter F1 and third filter F3, and those simply composed of a gas outlet pipe 18 piercing through the center thereof, e.g. second filter F2 and fourth filter F4 (though a discharge pipe runs through the final filter adjacent the exhaust side B, or the fourth filter F4 in the embodiment shown), are alternately arranged and connected altogether in series. The number of the filters F1, F2 and so fourth can be increased or decreased according to the type of fuel to be used and the quantity of gas to be exhausted. A most simplified form of such arrangement is illustrated in FIG. 3.

Next, the purification of exhaust gas in the filters will be described.

Exhaust gas purified to some extent in the separator P for pretreatment flows through the outlet pipe 8 into the heat-insulating expansion chamber 9 inside the first filter F1 and the gas temperature is decreased on account of the heat insulation and expansion in the chamber 9. It is therefore necessary to preset the volume of the heat-insulating expansion chamber 9 to a value enough to invite supersaturation of the chamber with water vapor due to the temperature drop as the result of the gas expansion. The gas in the chamber 9 then passes through the perforations of the perforated wall 10 of hollow spherical shape and reaches the condensing chamber 10 outside of said wall where the gas temperature further drops. Accordingly, in the heat-insulating expansion chamber 9 and condensing chamber 10, the gas is subjected to the same action as in the separator P for pretreatment, with the result that a group of water drops is formed in which noxious components of the gas are dissolved. Fine particles of carbon in the gas hit against the imperforated wall portion of the hollow perforated spherical wall 9 and are scattered in all directions. As the result, the carbon particles are kept from flowing directly into the outlet pipe 18 and discharge pipe 19.

The gas containing such group of water drops and fine carbon particles is partially scattered into the heat-resisting filter medium 13 through the perforations of the outer perforated wall 11 of hollow spherical shape. Then, by way of the perforations of the perforated wall 14, the gas is spread through the filter medium 13 of the second filter F2. Further, the gas passes through the filter medium 13 of the ensuing filtration chambers with successive expansion therein. Meanwhile, the water drops and fine carbon particles in the gas are caught and separated by the filter medium 13, and purified gas alone is led through the final perforated wall 17 and released into the air through the opening on the exhaust side B. The rest of gas in the condensing chamber 10 passes through the outlet pipe 18 into the heat-insulating expansion chamber 9 of the third filter F3, wherein it is subjected to the same treatment as in the first filter F1. The gas which is released into the exhaust side B by way of the last discharge pipe 19 is far less in both quantity and degree of contamination than the initial untreated gas. Thus, when the gas portion discharged through the pipe 19 and the gas portion led through the filter medium 13 are mixed up and discharged together, the mixed gas is in an almost completely purified state.

It is possible to provide fins (not shown) around the periphery of the casing 12 of filters in order to increase the thermal conductivity so that the temperature drop of the gas inside the filters can be facilitated and the heat insulation and expansion effects be enhanced.

Figure 4:
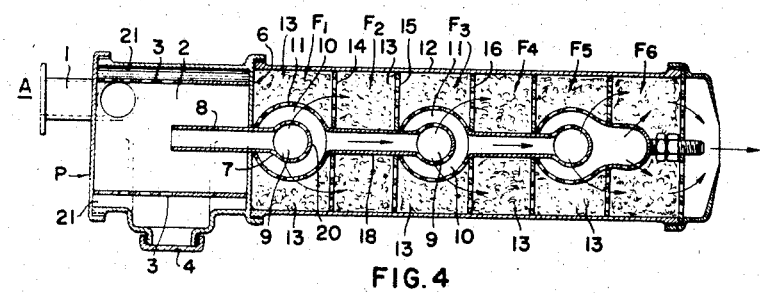
FIG. 4 is a longitudinal sectional view of still another form of the invention.

Further, by reference to FIG. 4, it will be seen that the figure illustrates another embodiment of the invention. This embodiment differs distinctively from those shown in FIGS. 1 and 4 in that it dispenses with the discharge pipe communicated to the final condensing chamber and which opens in the exhaust side B. Accordingly, in the embodiment of FIG. 4, no gas is directly released in the air bypassing the filter medium, but the total amount of gas is positively filtered through the filter medium for all the more complete purification.

Since the exhaust gas purifier according to the present invention has the construction and functions as above described, most of noxious substances and coarse carbon particles in the exhaust gas introduced into the purifier are first separated and settled in the separator for pretreatment use and only the rest of noxious substances and fine carbon particles in the gas are deposited on and separated by the filter medium as the result of heat insulation and expansion of the gas. With such arrangement coarse particles of carbon and other contents of the gas are not introduced into and deposited in the filtration chambers. Consequently the filtration capacity is greatly increased and the life of filters is considerably extended.

Also, fuel consumption of automotive engines can be saved because the adsorption of minute particles can be achieved most effectively and the exhaust pressure can be remarkably decreased.

Further, when a catalyst is contained in the filters, the effect of purification from noxious gases, e.g. carbon monoxide gas, is heightened. Such catalyst is used preferably in the final filter. The reason is two-fold: the catalytic effect is improved because the gas temperature is low enough in the final filter and the catalyst life can be lengthened because the gas is sufficiently purified there.

In FIGS. 5 through 8 there is shown still another form of the device embodying the present invention.

In the embodiment, the casing 12′ which accommodates filters is formed integrally with the outer cylinder of the pretreatment separator P, and is provided with a plurality of openings disposed serially along the axis thereof at points on the lower portion of one side. Inside the casing is held a perforated cylinder 25 which contains the filter elements. In other words, the outer cylinder of the separator P for pretreatment is extended to form the casing 12′. On the lower portion of the casing 12′, there are openings axially arranged and covered with trough-like vessels to provide chambers 23.

The constuction of the pretreatment separator P which is defined by the gastight partition plate 6 in the casing 12′ is identical with those already illustrated in FIGS. 1 to 4 and described hereinbefore. The filters F1, F2, F3 and so forth having filtration chambers defined respectively, by perforated wall plates 14, 15, 16 and so forth are accommodated in a perforated cylinder 25 of a smaller diameter than that of the casing 12′. The internal constructions of the filters F1, F2, F3 and so forth are also the same as those described above in connection with other embodiments of the invention, except that in these latter filters the perforated cylinder 25 is not fixedly secured to the perforated wall plates but there are provided spaces between the perforated walls 14, 15, 16 and so forth and the perforated cylinder 25 in such manner that the perforated cylinder 12 can be moved in the radial direction.

When the perforated cylinder 25 accommodating the filters F1, F2, F3, and so forth of the constructions as above described is placed into the casing 12′ and when the outlet pipe 8 is fitted securely in the central opening of the gastight partition plate 25, an annular space K is then defined between the casing 12′ and perforated cylinder 25. The last filter F6 is covered by a perforated plate 27 provided with a hole in the center through which the discharge pipe 19 protrudes, and the peripheral edge of the perforated plate 27 is flanged to the end of the casing 12′. Thus, the perforated cylinder 25 accommodating the filters F1, F2, F3 and so forth is disposed radially movably in the casing 12′. In an exhaust gas purifier of such construction, the gas which is fed in from the gas intake side A and is discharged on the exhaust side B is purified on the basis of the same principles and in the same process as described in connection with former embodiments but, because the perforated cylinder 25 which surrounds the filters F1, F2 and so forth is so disposed that it can move radially to some extent within the space K, the perforated cylinder 25 is swung radially by the vibrations due to running of the automobile and thus imparts shocks to the filter medium 13 therein. As the result, a large percentage of the deposit on the filter medium, e.g. fine carbon particles and other noxious substances is shaken off into the divided chambers of trough-like vessels 26 through the perforations of the casing 12′. Reference numerals 22, 22 indicate partition plates for defining the chambers of trough-like vessels 26 and numerals 24, 24 indicate caps for the drain ports for the collected sludge.

In this embodiment the perforated cylinder 25 and filter medium 13 are both vibrated to shake off the fine particles of carbon and the like from the filter medium 13 for subsequent accumulation and removal. Consequently, the filter medium 13 can always display its functions of catching carbon and the like and filtering the gas in satisfactory manner and can thus achieve a high filtration effect.

In FIG. 9 is shown, in longitudinal section, an exhaust gas purifier equipped with a separate sludge collecting tank. FIG. 10 is a cross sectional view of the collecting tank. In this arrangement, the structures, principles, functions and effects of the pretreatment separator P and filters F1, F2, F3, and so forth for the purification of exhaust gas are the same as those illustrated and described above in connection with FIGS. 1 through 3. There are some differences, however, in that the sludge vessel 4 of the pretreatment separator P is formed in one piece with the outer cylinder constituting the settling chamber 21 and is provided with an opening at the bottom, to which a pipe 29 is connected. Suitable filters, e.g. F2, F4 and so forth, are also provided with openings at the bottom of the casing 12, each fitted with a sludge vessel 28. The latter sludge vessels 28 are again provided with openings at the bottom and which are connected to pipes 30. The pipes 29 and 30 are communicated to an independent sludge collecting tank 31. Of course the pipes 29 and 30 to be used are those made of plastics such as rigid polyvinyl chloride which are resistant to heat as well as to acids and alkalis. Therefore, the condensed liquids containing noxious substances and carbon of exhaust gas and the coarse carbon particles which have dropped into the sludge vessels 4 and 28 are immediately collected into the tank 31 by way of the pipes 8 and 28. This prevents the noxious substances once dissolved in the condensed liquids and separated from the gas from being evaporated again and led into the filters F1, F2, and so forth. Designated at 25 is drain pipe and 26 is a passage for air balancing.

Figure 11:
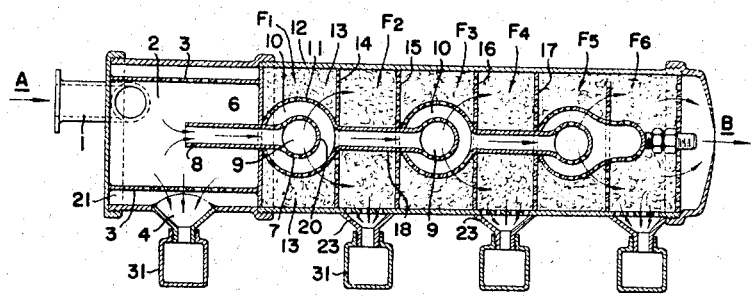
FIGS. 11 and 12 are longitudinal sectional views of other forms of the device shown in FIG. 9.

Shown in FIG. 11 is another form of the device illustrated in FIG. 10, having a plurality of sludge collecting tanks 31 detachably fitted to the respective sludge vessels 28. Such arrangement is useful in the applications where there is no space for providing an independent collecting tank 31 to be connected with pipes.

Figure 12:
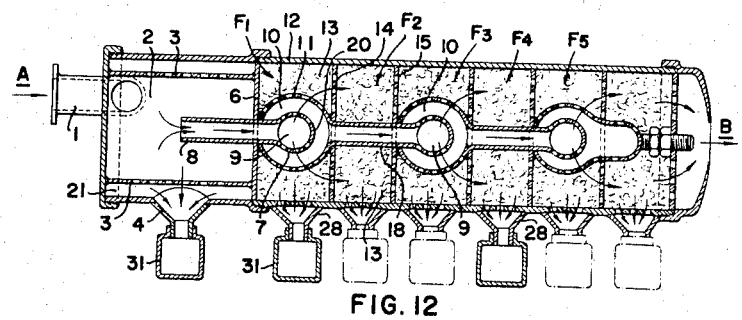

FIG. 12 shows an arrangement in which a plurality of collecting tanks 31 as illustrated in FIG. 11 are detachably fitted to the respective filters F1, F2, F3 and so forth.

Figure 13:
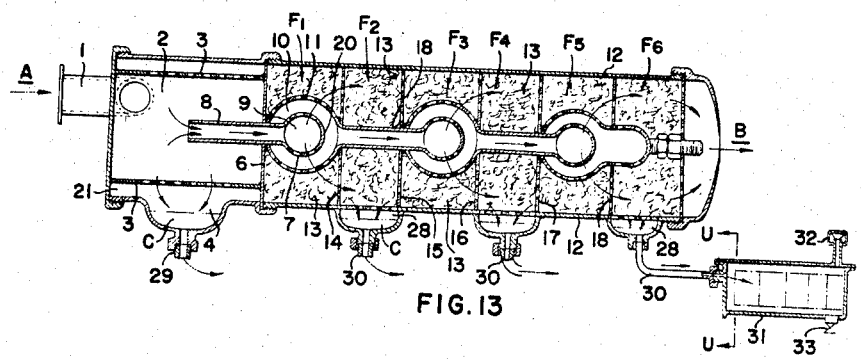
FIG. 13 is a longitudinal sectional view of an exhaust gas purifier equipped with a sludge collecting tank containing a neutralizer.
Figure 14:
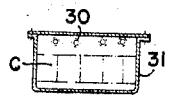
FIG. 14 is a cross-sectional view of the sludge tank shown in FIG. 13.

In the embodiment shown in FIGS. 13 and 14, a neutralizer C is contained in a single collecting tank 31, and the solution containing noxious components of gas which is introduced into the tank is neutralized by the neutralizer C composed of sodium carbonate, lime, dilute sulfuric acid and the like. Hence any release of separated noxious substances into the atmosphere is precluded. For the rest, the embodiment is constructed in the same way as described above in conjunction with the illustrations in FIGS. 1 to 3, 9 and 10.

The invention is not limited in any way to the embodiments herein described and illustrated but numerous variations and modifications in design are possible without departing from the spirit thereof as defined in the following claims.

I claim:
1. An exhaust gas purifier for an automobile comprising: a pretreatment separator including a heat-insulating expansion chamber for receiving raw exhaust gas, means for introducing the raw exhaust gas into the expansion chamber with a swirling motion to cause the exhaust gas to undergo expansion and consequent separation of water droplets and coarse carbon particles by centrifugal action, and a settling chamber which surrounds said heat-insulating expansion chamber for receiving separated water droplets and carbon particles; and at least one filter connected to the pretreatment chamber for receiving pre-treated exhaust gas therefrom, said filter comprising a gas expansion chamber which receives the pre-treated exhaust gas from said separator, a condensing chamber surrounding said gas expansion chamber and filter means surrounding said condensing chamber, at least a part of said gas flowing through said expansion chamber, condensing chamber and filter means, a sludge collecting chamber mounted on and in direct communication with at least said pretreatment separator at the bottom thereof, and a collecting tank connected with each said sludge collecting chamber for receiving sludge therefrom.

2. An exhaust gas purifier for automobile according to claim 1 wherein said collecting tank contains a neutralizer for neutralizing the sludge introduced thereinto.

3. An exhaust gas purifier according to claim 1 wherein said separator comprises a perforated cylinder between said expansion chamber and said settling chamber, a cylinder larger in diameter than said perforated cylinder, a second perforated cylinder supported in spaced relation in the latter said cylinder and housing said filter, means attaching the second perforated cylinder to the cylinder in which it is received for limited radial displacement and a storage chamber in communication with the space between said second perforated cylinder and its surrounding cylinder for receiving separated particles therefrom.

4. An exhaust gas purifier according to claim 1 wherein the pre-treatment separator and filters are provided with separate sludge collecting chambers which are connected respectively with separate pipes to an independent collecting tank.

5. An exhaust gas purifier according to claim 1 wherein the pre-treatment separator and filters are provided with separate sludge collecting chambers to which respective collecting tanks are detachably fixed.

6. An exhaust gas purifier according to claim 4 wherein each collecting tank contains a neutralizer for neutralizing the noxious wastes introduced thereinto.

References Cited

UNITED STATES PATENTS 3,061,416  10/1962  Kazokas _____ 60—30 X

JULIUS E. WEST, *Primary Examiner.*

DOUGLAS HART, *Assistant Examiner.*